A. HENDRICKS.

ADDING MACHINE STAND.

APPLICATION FILED APR. 29, 1909.

Reissued June 15, 1909.

12,973.

2 SHEETS—SHEET 1.

Witnesses
V. O. Van Antwerp
Palmer A. Jones.

Inventor
August in Hendricks
By Luther V. Moulton
Attorney

THE NORRIS PETERS CO., WASHINGTON, D. C.

A. HENDRICKS.

ADDING MACHINE STAND.

APPLICATION FILED APR. 29, 1909.

Reissued June 15, 1909.

12,973.

2 SHEETS—SHEET 2.

Witnesses

H. C. Van Antwerp

Palmer A. Jones

Inventor

Augustin Hendricks

By Luther V. Moulton

Attorney

UNITED STATES PATENT OFFICE.

AUGUSTIN HENDRICKS, OF GRAND RAPIDS, MICHIGAN.

ADDING-MACHINE STAND.

No. 12,973. Specification of Reissued Letters Patent. Reissued June 15, 1909.

Original No. 897,367, dated September 1, 1908, Serial No. 388,166. Application for reissue filed April 29, 1909. Serial No. 493,045.

*To all whom it may concern:*

Be it known that I, AUGUSTIN HENDRICKS, a citizen of the United States of America, residing at Grand Rapids, in the county of Kent and State of Michigan, have invented certain new and useful Improvements in Adding-Machine Stands; and I do hereby declare the following to be a full, clear, and exact description of the invention, such as will enable others skilled in the art to which it appertains to make and use the same.

Figure 1:
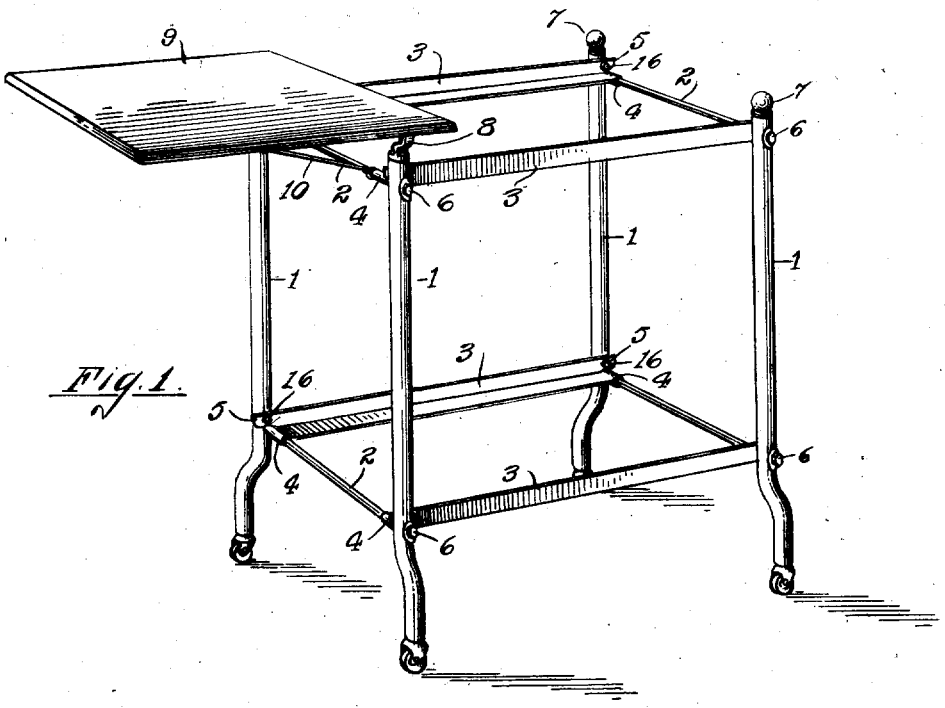
Figure 4:
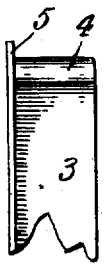
Figure 5:
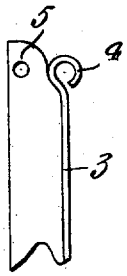
Figure 2:
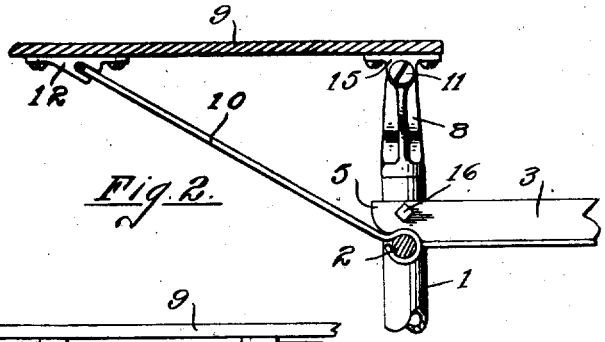
Figure 3:
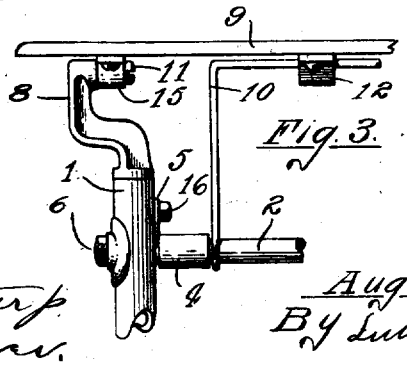
Figure 8:
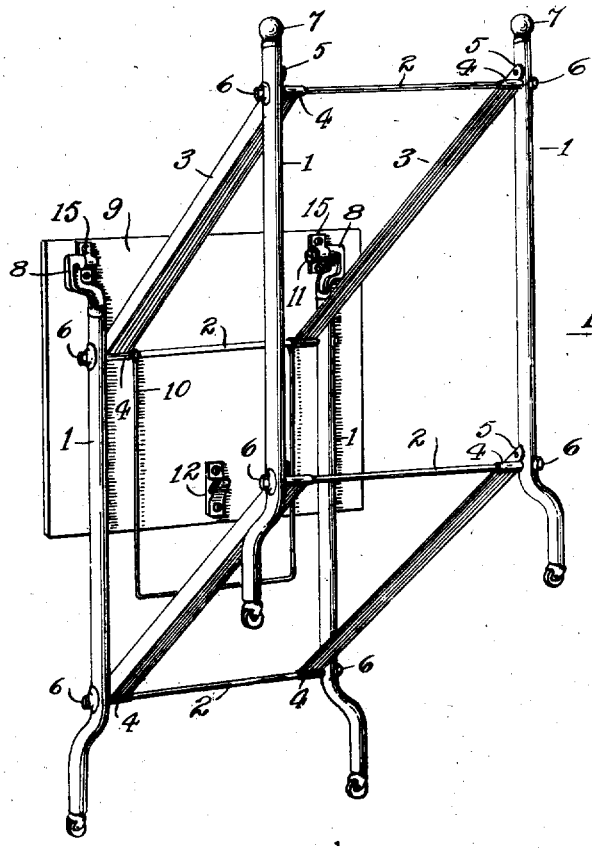
Figure 6:
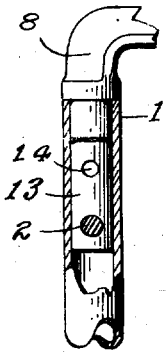
Figure 7:
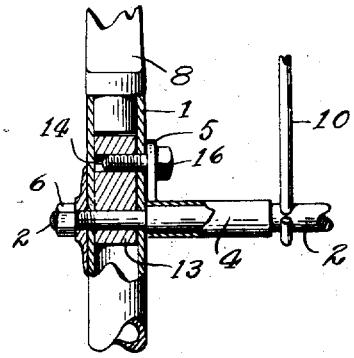
Figure 9:
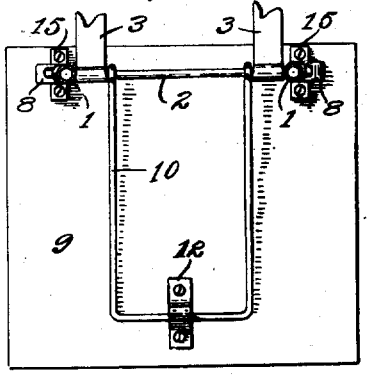

My invention relates to improvements in adding machine stands, and its object is to provide a convenient structure for supporting an adding machine, which structure shall be foldable for the purpose of storage or packing; to provide improved means for attaching a horizontally disposed angle bar and to a vertical post; and to provide the same with various new and useful features hereinafter more fully described and particularly pointed out in the claims, reference being had to the accompanying drawings, in which:

Figure 1. is a perspective of my device arranged for use; Fig. 2. an enlarged detail of the shelf and supports therefor showing the same in vertical section; Fig. 3. a detail of the upper end of the bracket and a portion of the shelf; Figs. 4 and 5 enlarged details in different positions of the end of the angle iron bars; Fig. 6. an enlarged detail of the upper end of one of the legs; Fig. 7. the same shown at right angles to Fig. 6. and with a portion of one of the cross bars. (Fig. 6 and Fig. 7 have parts broken away to show the construction). Fig. 8. a perspective of the device partially folded; and, Fig. 9. an inverted plan view of the parts shown in Fig. 2.

Like numbers refer to like parts in all of the figures.

1 represents the corner posts or legs preferably consisting of metal tubes or pipes, 2 horizontally disposed rods connecting the respective pairs of legs at the respective ends of the structure; 3 horizontally disposed angle irons connecting the rods 2 near the respective front and rear legs of the structure. The horizontal members of these angle irons are severed from the vertical members and shaped in tubular form as at 4 to receive the rods 2 and pivotally connect the same. The vertical members of the angle irons are extended above the tubular portions 4 as at 5 and perforated to receive removable cap screws 16, whereby the said angle irons are securely attached to the legs 1 when the device is assembled for use, and detached therefrom for folding the device when out of use. These rods 2 and angle irons 3 are arranged in respective sets of two rods and two angle irons near the respective upper and lower ends of the legs, and together with the legs form a substantial framework foldable by removing the cap screws therein. Inserted in the upper ends of two of these tubular legs for the purpose of forming a finish, I provide any convenient ornaments 7, each having a suitable lug or projection to insert in the upper end of the tube. At one end of this frame and for the purpose of supporting a foldable shelf 9, I provide two brackets 8 each inserted in the upper end of a leg 1 and extending upward and outward therefrom, the upper end of each bracket being pivotally attached by a screw 11 to a support 15 attached to the inner end of the shelf 9. The outer end of this shelf is supported by a brace 10 pivotally connected to the upper rod 2 at its respective ends at the middle extending transversely beneath the shelf 9, and engaged in a recessed support 12 attached to the under side of the shelf, whereby the shelf and braces 10 are adapted to be folded alongside of the legs 11 by detaching the brace 10 from the support 12.

To form suitable fastenings for the cap screws 16 and also to afford substantial supports for the rods 2, plugs 13 are inserted within the legs 1 near the lower end of which plugs are openings to receive the rod 2 and near the upper end of the same are screw threaded openings 14 to receive the cap screws 16. I am thus able by removing the cap screws 16 to fold this device in compact form for packing, storage or other purposes, and when assembled for use and the screws inserted, the device provides a substantial and strong support for an adding machine or other article to be placed thereon, such machines preferably being placed upon the horizontal members of the upper angle irons and retained thereon by the vertical members of said irons and the rods 2, the shelf 9 being supported in convenient position to receive papers, documents or other articles as occasion may require.

What I claim is:

1. A stand comprising four legs, rods projecting horizontally from the legs and angle bars having horizontal members turned around the rods at the ends and supported thereby and having vertical members extending parallel with the sides of the legs.

2. A stand comprising four legs, horizontal rods connecting the legs in pairs, angle bars having horizontal members turned in tubular form around the rods at the ends, and pivotally supported thereby, and having vertical members engaging the adjacent sides of the legs.

3. A stand comprising four legs, horizontal rods connecting the legs in pairs, angle bars having horizontal members, turned in tubular form around said rods at their respective ends, and having their vertical members engaging the sides of the respective legs, and means for attaching said vertical members to said legs.

4. A stand comprising four legs, rods connecting the legs in pairs, angle bars each pivotally attached to the rods at the ends, and removable cap screws detachably securing each angle bar to the adjacent leg.

5. A stand comprising four legs, rods connecting said legs in pairs, angle bars each having one member formed tubular at each end to pivotally surround and connect the rods, and having the other member perforated for cap screws, and cap screws detachably inserted in said perforations and in the adjacent leg.

6. A stand comprising four tubular legs, rods connecting the legs in pairs, angle bars each having one member turned in tubular form to receive the rods and pivotally engage the same, cap screws detachably inserted in the other member of each angle bar and in the adjacent leg, brackets inserted in the upper ends of one pair of legs, a table pivotally attached to the brackets at one side, and a brace pivoted on the rod which connects said legs and detachably engaging a recessed support beneath the other side of the table.

7. A stand comprising four tubular legs, rods connecting the legs in pairs at the respective ends of the stand, angle bars each having one member turned in tubular form and surrounding the respective rods and also rotative thereon, cap screws removably inserted in openings in the other member of each bar and in the adjacent leg, a bracket inserted in the top of each of two legs, a brace pivoted on a rod connecting said legs and extending transversely beneath the outer side of the table, a table supported on said brackets and brace, a support under one side of the table and pivoted to the upper ends of the brackets, and a support under the other side of the table and having recesses to receive the brace.

8. A stand comprising a tubular leg, a rod extending through the leg, an angle bar having a horizontal member surrounding the rod and rotative thereon, and also having a vertical member engaging the side of the leg, a cap screw inserted in the vertical member and the leg, and a plug in the leg and having an opening to receive the rod and a screw threaded opening to receive the cap screw.

In testimony whereof I affix my signature in the presence of two witnesses.

AUGUSTIN HENDRICKS.

Witnesses:
GEORGIANA CHACE,
LUTHER V. MOULTON.